March 10, 1936.  G. CARSILLO  2,033,754

GAMBREL

Filed June 3, 1931

INVENTOR.
GIOVANNI CARSILLO
BY
ADCaesar
ATTORNEY.

Patented Mar. 10, 1936

2,033,754

UNITED STATES PATENT OFFICE 2,033,754

GAMBREL

Giovanni Carsillo, Philadelphia, Pa.

Application June 3, 1931, Serial No. 541,760

5 Claims. (Cl. 17—24)

This invention relates to gambrels and has for its object the production of a new and improved gambrel.

More particularly stated, it is one of the objects of this invention to produce a gambrel which will receive the animal to be dressed or skinned immediately after the first leg has been finished and which will carry the said animal throughout the dressing or skinning operation directly into the refrigerators, thus obviating the necessity of the several changes from the shackles to the different hooks and from the hooks to a special gambrel which is the practice at the present time.

Another of the objects of this invention is to produce a gambrel of simple construction which will permit the operator to rotate the animal being skinned or dressed in a horizontal plane during the skinning or dressing operation.

Another of the objects of this invention is to produce a gambrel which can be used both in slaughter houses where the continuous belt or chain system of skinning and dressing is used and in the slaughter houses which use the manual system.

It is a further object of this invention to produce a gambrel having all of the aforesaid characteristics but which shall nevertheless be of simple construction and which shall be easy to manufacture, assemble and use.

These as well as other objects of this invention and the advantages arising therefrom will become fully apparent from the following description and the drawing which forms a part thereof.

In the drawing, Figure 1 is a front view of my new and improved gambrel. The full lines show the gambrel being carried by its supporting bracket and its supporting bracket being carried by a chain belt, as during the dressing or skinning operation, while the dot and dash lines show the gambrel upon the delivery track dissociated from its supporting bracket and show further the supporting bracket being carried away as at the end of the skinning or dressing operation.

Figure 2 is a side view of the disclosure shown in Figure 1. The full lines show the gambrel being carried by its supporting bracket and the supporting bracket being carried by a chain belt, while the dot and dash lines show the gambrel upon the delivery bracket and dissociated from the supporting bracket.

Figure 3 is a top view of the disclosure of Figure 1 showing the relative arrangement of the chain conveyor belt and the delivery track. The major portion of the gambrel is omitted for the purpose of clearness. The full lines show the gambrel as being carried by its supporting bracket and the supporting bracket being carried by the chain-belt, while the dot and dash lines show the supporting bracket dissociated from the gambrels and being carried away by the chain-belt.

Figures 1, 2:
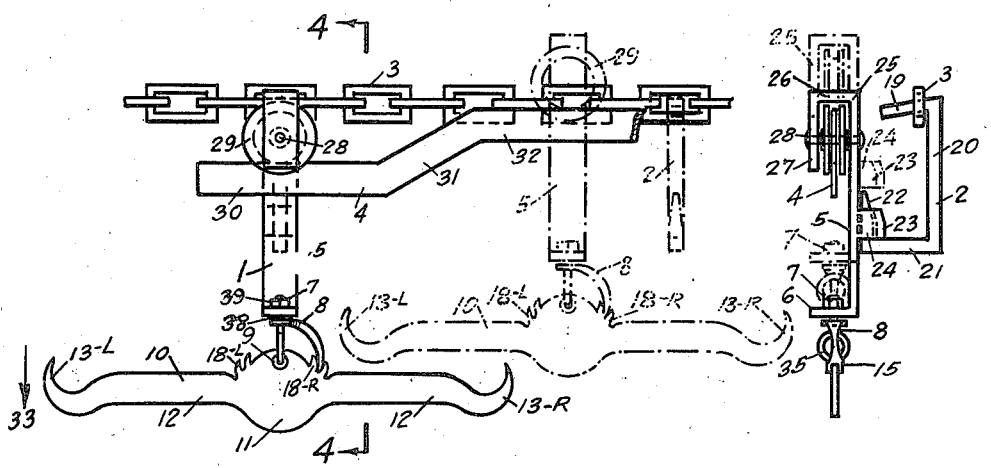
Figure 3:
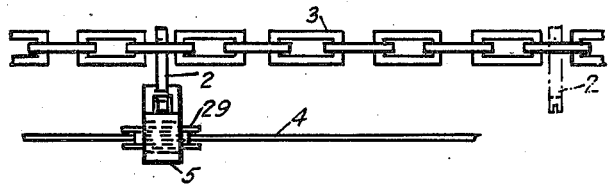

Referring more particularly to the drawing wherein similar reference numerals denote similar parts, reference numeral 1 denotes the gambrel as a unit which is carried by a supporting bracket 2 which in turn is carried by the travelling chain belt 3. The chain belt 3 may be of any type desired and in itself does not form a part of my invention and for that reason will not be here more particularly described.

The gambrel 1 is composed of a main body bracket 5, an eye bolt 7, a pawl 8, and arm members 10 and a supporting wheel 29.

The main body bracket 5 terminates at its lower end in the angle portion 6 which has a suitable aperture formed therein through which the eyebolt 7 extends loosely, thus resulting in the pivotal mounting of the eye bolt 7 in the angle member 6. The main body bracket 5 terminates at its upper end in an inverted U shaped member 25 formed by the upper part of the body member 5 and by the horizontal portion 26 and the vertical arm 27. The inverted U shaped member 25 has journalled therein the pin 28 on which is freely mounted the wheel 29. The main body bracket 5 has further formed thereon the boss 23 which has the aperture 24 formed therein for the purpose of receiving the hook 22 of the supporting bracket 2.

The eye bolt 7 has a vertical stem 38 terminating at its upper end in the anchoring nut 39 and at its lower end in the eye portion 35. The stem 38 of the eye bolt 7 extends loosely through a suitable aperture in the arm 6 and further extends loosely through an aperture 40 formed in the pawl 8, thus resulting in the pivotal mounting of the eye bolt 7 in the arm 6 and the pivotal mounting of the pawl 8 upon the eye bolt 7. The eye portion 35 of the eye bolt 7 extends loosely through an aperture 9 formed in the central portion 11 of the arm member 10 and thus results in the pivotal mounting of the arm member 10 upon the eye portion 35 of the eye bolt 7.

The arm member 10 is composed of a central portion 11 from which branch arms 12 which terminate in hook members 13—L and 13—R respectively. The central portion 11 has the two sets of teeth 18—L and 18—R formed thereon as shown in Figure 1 which are adapted to cooperate with the pawl 8 to lock the arm member 10 against movement in all planes except the horizontal.

The pawl 8 is composed of a curved body member 14 which terminates at its upper end in the portion 36 having the aperture 40 formed therein and at its lower end in the forked portion 15. The fork teeth 37 of the fork member 15 bound and form the space 17, the upper bounding member of which is the tooth 16.

The supporting bracket 2 is composed of a vertical main arm 20, which terminates at its upper end in a chain engaging arm formed at an angle to the main arm 20. The main arm 20 terminates at its lower end in the arm 21 at right angles to the arm 20. The arm 21 in turn terminates in the upwardly extending boss engaging arm 22.

It is to be noted that the above described mounting of the eye bolt, the pawl and the carrier arm 10, the carrier arm is capable of moving in all planes. The teeth 18—L and 18—R and pawl 8 make possible the locking of the carrier arm 10 in several positions, thus adapting the said carrier arm for being locked in different positions suitable for use by persons of differing height.

Although the manner of assembly and the method of use of the gambrels here disclosed is believed to be obvious to those skilled in the art in the view of the foregoing disclosure yet to obviate any possible misunderstanding, the following detailed description is here given.

To manufacture the gambrels, it is only necessary to form the body bracket 5, the wheel 29, the eye bolt 7, the pawl 8 and the arm member 10 and assemble them as shown in Figures 1 and 2. The supporting bracket 2 is made up to take the form shown in Figures 1 and 2.

The device operates as follows:—

I start at that point in the practice which is general today where one leg of the animal has been shackled and the animal has been suspended from a supporting track by means of a wheel generally similar to the wheel 29, herein shown in Figure 1, and which forms part of the shackle. The animal has been killed and the first leg has been skinned. The shackle used can be any one of the well known shackles now in general use and does not form a part of this invention. For this reason it will not be here further described. Let it be assumed that the shackle is on the right leg and therefore, that the leg which has been skinned is the left leg. Let it be further assumed that the supporting track on which the shackled animal is being carried is so situated with reference to the chain belt conveyor 3 that the hooks 13 of the arms 12 of the arm member 10 of the gambrel 1 being carried by the chain conveyor 3 can readily reach the skinned leg of the animal being carried by the shackle.

As the conveyor brings a gambrel to the proper and predetermined point, the proper operator now inserts the hook 13—L of the arm member 10 in the left leg and fixes the pawl so that its tooth 16 engages with the teeth 18—R formed on the central portion 11 of the arm member 10 to take the position shown in Figure 2. The animal is now suspended by its left leg and free to be rotated only in a horizontal plane. The arm is locked against movement in any other plane by the pawl 8. The second or right leg is now skinned. The operator has full and ready access to every part of the animal he desires to reach without any necessity of change of position on his part due to the fact that the animal is rotatable in a horizontal plane. When the right leg has been skinned, the proper operator removes the pawl 8 from its locking position. This makes it possible to move the arm hook 13—R downwardly about the point of suspension of the arm 10 in the eye bolt 7 as a fulcrum and to insert the hook 13—R into the finished right leg. The proper operator now finishes the skinning operation and other operators perform the necessary and well known dressing operations.

It is to be remembered that during this entire series of operations the belt conveyor has been carrying the animal forward from one operator to another. By the time the last operation has been finished and the animal has been fully skinned and dressed the belt brings the gambrel and the animal which it carries to the delivery track or the relative position shown in Figure 1. As the belt travels along the wheel 29 of the gambrel 1 contacts with the tract member 4 and is carried up the incline 31 to the level portion 32 of the track 4. As the wheel 29 rises up on the incline 31 of the track 4 the said incline serves as a cam to raise the gambrel 1 and to cause the boss 23 to be raised above the end of the boss engaging arm, as is clearly shown by the dotted lines in Figure 2, thus resulting in a disengagement or dissociation of the gambrel from its supporting bracket 2. The gambrel and the animal which it carries is now pushed along the delivery track to the refrigerators or to wherever it is desired to deliver the fully dressed animal while the supporting bracket is carried on by the chain belt 3 to the position where an operator places another gambrel 1 upon it so that the above entitled steps may be repeated.

Figure 6:
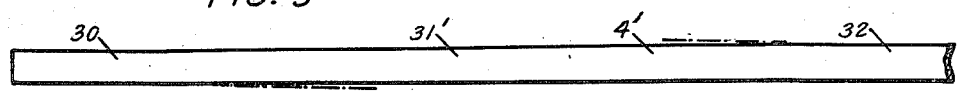
Figure 6 is a side view of a modified delivery track to be used in the disclosure in Figure 1.

It is to be noted that although the track 4 is so formed that the incline 31 ends approximately at a point where the boss 23 becomes free of the boss engaging arm 22, nevertheless, it is possible that the loaded gambrel may not reach the track portion 32 due to the fact that the loaded gambrel does not have sufficient momentum to overcome the force of gravity which acts to urge the loaded gambrel down the inclined plane 31. It is further to be noted that it is also possible that the loaded gambrel may become disengaged from its supporting bracket at some point along the inclined track 31 below that at which it is theoretically designed to do so. This would especially occur in cases where the supporting bracket 2 was pivotally or loosely mounted in the chain belt 3 and the angle of incline of the track portion 31 was comparatively large such as is shown in Figure 1. It would be less likely to happen if the angle of incline was comparatively small as is shown at 31' in Figure 6 where the track 4' is composed of the straight track portions 30 and 32 connected by the inclined portion 31' having a very small grade. Such a track when combined with a rigid supporting bracket 2 would in all probability carry the loaded gambrel to a point so close to the top of the inclined portion of the track 4 that the momentum of the loaded gambrel would be sufficient to carry the gambrel onward to straight upper track portion 32. However, if necessary a man could be stationed at the proper point along the incline track for the purpose of imparting the extra energy necessary to push the loaded gambrel up the incline. Or instead of placing a man at the proper point, a properly constructed belt could be installed for this purpose.

Instead of using the gambrel herein shown in association with a supporting bracket 2 and the chain 3, it may be used alone on the simple track systems now in general use. In such an event, the gambrel would be supported on a track similar to the track 4 of Figure 1, but without the incline unless such an incline was necessary to lift the gambrel and its load from a room at a low level to a room at a higher level. Although the gambrel shown in Figures 1 and 2 can very readily be used for this purpose, I prefer to use a structure such as shown in Figure 4 in such cases.

Figure 4:
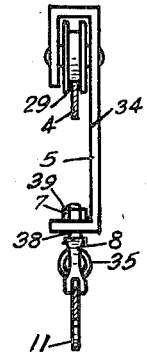
Figure 4 is a section, taken on a line corresponding to 4—4 of Figure 1, of a modified form of my gambrel designed especially for slaughter houses which use the manual system.
Figure 5:
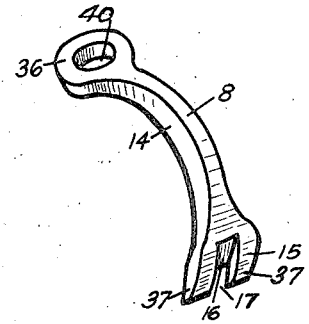
Figure 5 is a perspective view of a pawl which forms a part of my gambrel.

The gambrel 34 shown in Figure 4 differs from that shown in Figures 1 and 2 only in the fact that the boss 23 has been omitted since the same is no longer necessary. It is obvious of course that the supporting bracket 2 is entirely omitted since the same is no longer necessary.

It is to be understood that the above disclosure is for the purposes of illustration only and not limitation since many changes may be made in the device here disclosed without departing from the spirit of my invention. For this reason it is my desire that the claims which are hereunto appended for the purpose of defining my invention should be limited only by the prior art.

I claim:

1. A gambrel consisting of a body bracket, a wheel pivotally mounted in the said body bracket, an arm member carried by the said body bracket and mounted for movement in a plurality of planes, teeth formed on said arm member and a pawl pivotally carried by the said body bracket, the said pawl being positioned for engagement with the said teeth on the said arm member to limit the upward swinging motion of the said arm member.

2. A gambrel consisting of a body bracket, means formed on the said body bracket for engagement with a chain belt, an arm member carried by the said body bracket and mounted for movement in a plurality of planes, teeth formed on said arm member, and a pawl pivotally carried by the said body bracket, the said pawl being positioned for engagement with the said teeth on the said arm member to limit the upward swinging motion of the said arm member.

3. A gambrel consisting of a body bracket terminating at its lower end in an arm extending at right angles thereto and at its upper end in an inverted U shaped bearing member, a wheel pivotally mounted in the said U shaped bearing member, a boss formed on the said body member having an aperture therein, the said aperture being adapted to receive a chain engaging member therein, an eye bolt pivotally mounted in the said right angled arm, a pawl pivotally mounted on the said eye bolt, an animal bearing arm member pivotally mounted on the said eye bolt, the said animal bearing arm member consisting of a central body portion having outwardly branching arms which terminate in animal engaging hooks, and teeth formed on the said central body member and positioned for operative engagement with the said pawl whereby the said pawl and the said teeth will cooperate to lock the said animal bearing arm member against rotation in a vertical plane.

4. A gambrel for use in combination with a conveyor belt consisting of a supporting member terminating at one of its ends in a conveyor engaging means and at the other of its ends in a gambrel portion engaging means, and a gambrel portion, the said gambrel portion consisting of a main body portion, means formed on the said body portion for engaging the said gambrel engaging means of the said supporting member, an animal bearing arm member having supporting hooks formed thereon carried by the said body portion and mounted for movement in a plurality of planes, and cooperating male and female and locking members, one carried by the said animal bearing arm member and the other carried by the said body portion, for locking the said arm against movement in a vertical plane.

5. Means for conveying and supporting an animal during the dressing and skinning operations consisting of a conveyor belt; a gambrel supporting member carried by the said conveyor belt, the said gambrel supporting member terminating at one of its ends in a conveyor engaging portion and at the other of its ends in a gambrel engaging portion; a gambrel carried by the said gambrel supporting member, the said gambrel consisting of a body portion, means formed on the said body portion for engaging the said gambrel engaging portion of the said supporting member, a wheel carried by the said body portion for operatively engaging a secondary carrier, an animal bearing arm member carried by the said body portion and positioned for movement in a plurality of planes, teeth formed on the said arm member and a pawl pivotally carried by the said body portion and positioned for operatively engaging the said teeth formed on the said animal bearing arm member for locking the said arm member against movement in a vertical plane; and a track having an inclined portion formed therein positioned in the path of travel of the said wheel carried by the said gambrel, the said incline on the said track beginning at a point approximately below the said wheel and being of sufficient height to raise the said gambrel and to cause the disengagement of the said gambrel from the said supporting member.

GIOVANNI CARSILLO.